(12) United States Patent
Madan et al.

(10) Patent No.: US 11,620,836 B2
(45) Date of Patent: Apr. 4, 2023

(54) LIGHT EMITTING DIODE FLICKER MITIGATION

(71) Applicant: Argo AI, LLC, Pittsburgh, PA (US)

(72) Inventors: Siddharth Madan, San Jose, CA (US); Richard L. Kwant, San Bruno, CA (US)

(73) Assignee: Argo AI, LLC, Pittsburgh, PA (US)

( * ) Notice: Subject to any disclaimer, the term of this patent is extended or adjusted under 35 U.S.C. 154(b) by 45 days.

(21) Appl. No.: 17/111,848

(22) Filed: Dec. 4, 2020

(65) Prior Publication Data
US 2022/0180108 A1 Jun. 9, 2022

(51) Int. Cl.
| | |
|---|---|
| G06V 20/58 | (2022.01) |
| G06K 9/62 | (2022.01) |
| B60W 60/00 | (2020.01) |
| G06V 10/56 | (2022.01) |

(52) U.S. Cl.
CPC ......... G06V 20/584 (2022.01); B60W 60/001 (2020.02); G06K 9/6265 (2013.01); G06K 9/6267 (2013.01); G06V 10/56 (2022.01)

(58) Field of Classification Search
CPC ..... G06V 20/584; G06V 10/56; G06K 9/6265
See application file for complete search history.

(56) References Cited

U.S. PATENT DOCUMENTS

| | | | |
|---|---|---|---|
| 9,142,127 B1 | 9/2015 | McDevitt-Pimbley et al. | |
| 10,012,997 B2 | 7/2018 | Shalom et al. | |
| 10,118,614 B2 | 11/2018 | Delp | |
| 10,473,470 B2 | 11/2019 | Iagnemma et al. | |
| 2015/0210277 A1* | 7/2015 | Ben Shalom | G05D 1/0088 382/104 |
| 2017/0277193 A1 | 9/2017 | Frazzoli et al. | |
| 2018/0284771 A1 | 10/2018 | Ravichandran et al. | |
| 2018/0286226 A1 | 10/2018 | Li et al. | |

(Continued)

FOREIGN PATENT DOCUMENTS

| | | |
|---|---|---|
| CN | 106462727 B | 2/2020 |
| JP | 2017516135 A | 6/2017 |

(Continued)

OTHER PUBLICATIONS

Traffic, C. "Manual on uniform traffic control devices." U.S Department of Transportation, Federal Highway Administation. (2009). (Year: 2009).*

*Primary Examiner* — David Perlman
(74) *Attorney, Agent, or Firm* — Fox Rothschild LLP

(57) ABSTRACT

Systems and methods are provided for detecting a flashing light on one or more traffic signal devices. The method includes capturing a series of images of one or more traffic signal elements in a traffic signal device over a length of time. The method further includes, for each traffic signal element, analyzing the series of images to determine one or more time periods at which the traffic signal element is in an on state or an off state, and analyzing the time periods to determine one or more distinct on states and one or more distinct off states. The method further includes identifying one or more cycles correlating to a distinct on state immediately followed by a distinct off state, or a distinct off state immediately followed by a distinct on state, and, upon identifying a threshold number adjacent cycles, classifying the traffic signal element as a flashing light.

18 Claims, 7 Drawing Sheets

(56) References Cited

U.S. PATENT DOCUMENTS

| | | | |
|---|---|---|---|
| 2019/0232957 A1 | 8/2019 | Frazzoli et al. | |
| 2019/0283756 A1 | 9/2019 | Leonard et al. | |
| 2019/0332875 A1* | 10/2019 | Vallespi-Gonzalez | ........................ G05D 1/0088 |
| 2020/0055524 A1 | 2/2020 | Lacaze et al. | |
| 2020/0081448 A1 | 3/2020 | Creusot | |
| 2020/0081450 A1 | 3/2020 | Creusot et al. | |
| 2020/0082186 A1* | 3/2020 | Li | ........................ G06V 20/584 |
| 2020/0225681 A1 | 7/2020 | Stein et al. | |
| 2020/0265709 A1 | 8/2020 | Bush et al. | |
| 2021/0343143 A1* | 11/2021 | Korjus | ..................... G06N 3/02 |
| 2021/0390349 A1* | 12/2021 | Hotson | ................. B60W 40/04 |
| 2021/0397827 A1* | 12/2021 | Silver | ............... B60W 60/0025 |

FOREIGN PATENT DOCUMENTS

| | | |
|---|---|---|
| JP | 2019512824 A | 5/2019 |
| WO | 2020076280 A1 | 4/2020 |
| WO | 2020086398 A1 | 4/2020 |

* cited by examiner

LIGHT EMITTING DIODE FLICKER MITIGATION

BACKGROUND

Statement of the Technical Field

The present disclosure relates to traffic signal element state classification and, in particular, to mitigating light emitting diode ("LED") flickering during traffic signal element state classification.

Description of the Related Art

Object detection and analyzation are critical to safe driving, particularly pertaining to autonomous vehicles ("AVs"). One type of object that requires particular care when identifying and analyzing is a traffic signal device. Traffic signal devices indicate when it is the safe, legal, and appropriate time for vehicles to pass or enter certain intersections or other regions. For this reason, AVs require the ability to accurately detect and analyze traffic signal devices.

Traffic signal devices may be detected using standard object detection techniques, and image analysis is performed for each traffic signal element in the traffic signal device in order to determine a state for each traffic signal element in the traffic signal device. However, modern traffic signal devices often include light emitting diodes ("LEDs") for the traffic signal elements. LEDs have irregular variations in their intensities, which vary according to power cycles. When these traffic signal devices are captured in video sequences, they may appear to flicker due to the variations in their intensities and the frequency and exposure settings of the camera used. This flickering poses a problem for traffic signal element state determination since this flickering could potentially be misinterpreted for a flashing traffic signal element (e.g., a flashing red light or a flashing yellow light).

Therefore, for at least these reasons, a better method of accurately determining between flashing traffic signal elements and traffic signal elements which are flickering is needed.

SUMMARY

According to an aspect of the present disclosure, a method of detecting a flashing light on one or more traffic signal devices is provided. The method includes, by one or more image capturing devices of an autonomous vehicle, capturing a series of images of one or more traffic signal elements over a length of time, wherein each traffic signal element is in a traffic signal device. The method further includes, by an autonomous vehicle control system of the autonomous vehicle, for each traffic signal element in the one or more traffic signal elements, analyzing the series of images to determine one or more time periods at which the traffic signal element is in an on state, and one or more time periods at which the traffic signal element is in an off state, and analyzing the time periods to determine one or more distinct on states and one or more distinct off states. A distinct on state correlates to a time period when the traffic signal element is in the on state for a length of time that equals to or exceeds a lower threshold, and a distinct off state correlates to a time period when the traffic signal element is in the off state for a length of time that equals to or exceeds a lower threshold. The method further includes identifying one or more cycles correlating to a distinct on state immediately followed by a distinct off state, or a distinct off state immediately followed by a distinct on state, and, upon identifying a threshold number adjacent cycles, classifying the traffic signal element as a flashing light.

According to various embodiments, the analyzing the series of images includes generating a confidence score, for each image in the series of images, that the traffic signal element is in the on state.

According to various embodiments, the analyzing the series of images includes generating a confidence score, for each image in the series of images, that the traffic signal element is in the off state.

According to various embodiments, the method further includes, by the autonomous vehicle control system of the autonomous vehicle, sending a command to the autonomous vehicle to perform one or more instructions associated with the flashing light.

According to various embodiments, the one or more instructions include one or more of the following: stop, and decrease speed.

According to various embodiments, each of the one or more traffic signal elements includes a light emitting diode.

According to various embodiments, the light emitting diode is a yellow light emitting diode or a red light emitting diode.

According to various embodiments, the one or more image capturing devices include a plurality of image capturing devices, and further comprising comparing the series of images for each image capturing device in the plurality of image capturing devices.

According to various embodiments, the distinct on state correlates to the time period when the traffic signal element is in the on state for the length of time that, in addition to equaling or exceeding the lower threshold, is less than or equal to an upper threshold.

According to various embodiments, the distinct off state correlates to the time period when the traffic signal element is in the off state for the length of time that, in addition to equaling or exceeding the lower threshold, is less than or equal to an upper threshold.

According to various embodiments, the one or more traffic signal elements include a plurality of redundant traffic signal elements, and the method further includes comparing one or more cycles of each of the plurality of redundant traffic signal elements.

According to another aspect of the present disclosure, a system for detecting a flashing light on one or more traffic signal devices is provided. The system includes an autonomous vehicle, one or more image capturing devices of the autonomous vehicle configured to capture a series of images of one or more traffic signal elements in a traffic signal device over a length of time, and a computing device of the autonomous vehicle including a processor and a memory. The computing device includes instructions that cause the computing device to analyze the series of images to determine one or more time periods at which the traffic signal element is in an on state, and one or more time periods at which the traffic signal element is in an off state, and analyze the time periods to determine one or more distinct on states and one or more distinct off states. A distinct on state correlates to a time period when the traffic signal element is in the on state for a length of time that equals to or exceeds a lower threshold, and a distinct off state correlates to a time period when the traffic signal element is in the off state for a length of time that equals to or exceeds a lower threshold. The instructions further cause the computing device to identify one or more cycles and, upon identifying a threshold number adjacent cycles, classify the traffic signal element as a flashing light. Each cycle correlates to a distinct on state immediately followed by a distinct off state, or a distinct off state immediately followed by a distinct on state.

According to various embodiments, the analyzing the series of images includes generating a confidence score, for each image in the series of images, that the traffic signal element is in the on state.

According to various embodiments, the analyzing the series of images includes generating a confidence score, for each image in the series of images, that the traffic signal element is in the off state.

According to various embodiments, the instructions are further configured to cause the computing device to send a command to the autonomous vehicle to perform one or more in-structions associated with the flashing light.

According to various embodiments, the one or more instructions include one or more of the following: stop, and decrease speed.

According to various embodiments, each of the one or more traffic signal elements includes a light emitting diode.

According to various embodiments, the light emitting diode is a yellow light emitting diode or a red light emitting diode.

According to various embodiments, the one or more image capturing devices include a plurality of image capturing devices, and the instructions are further configured to cause the computing device to com-pare the series of images for each image capturing device in the plurality of image capturing devices.

According to various embodiments, the distinct on state correlates to the time period when the traffic signal element is in the on state for the length of time that, in addition to equaling or exceeding the lower threshold, is less than or equal to an upper threshold.

According to various embodiments, the distinct off state correlates to the time period when the traffic signal element is in the off state for the length of time that, in addition to equaling or exceeding the lower threshold, is less than or equal to an upper threshold.

According to various embodiments, the one or more traffic signal elements include a plurality of redundant traffic signal elements, and the instructions are further configured to cause the computing device to compare one or more cycles of each of the plurality of redundant traffic signal elements.

DETAILED DESCRIPTION

Figure 1:
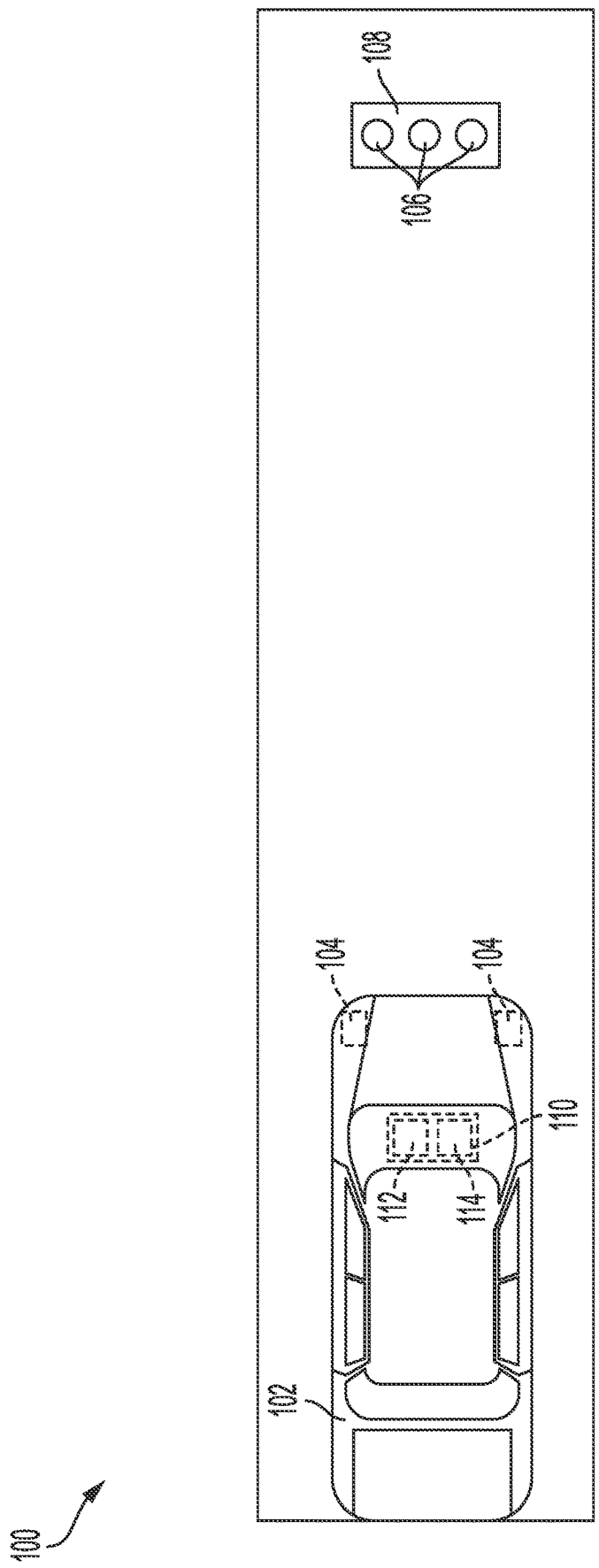
FIG. 1 is an example of a flashing light detection system, in accordance with various embodiments of the present disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Referring now to FIG. 1, an example of a flashing light detection system 100 is provided, in accordance with various embodiments of the present disclosure.

According to various embodiments, the system 100 includes an autonomous vehicle 102, which includes one or more image capturing devices 104 such as, for example, one or more cameras, configured to visually capture a plurality of images of one or more traffic signal elements 106 of one or more traffic signal devices 108.

The system 100 includes one or more computing devices 110. According to various embodiments, the one or more computing devices 110 function as an AV control system. The one or more computing devices 110 can be coupled and/or integrated with the AV 102 and/or remote from the AV 102, with data collected by the one or more image capturing devices 104 being sent, via wired and/or wireless connection, to the one or more computing devices 110.

Traffic signal elements 106 are dynamic in that they can be changed between at least two states to transmit traffic instructions to one or more drivers, and different types of traffic signal elements 106 may be present in a single traffic signal device 110. Examples of traffic signal elements 106 may include, for example, a red light, a yellow light and a green light. Other examples include lights with directional arrows (such as arrows pointing left or right), other symbols (such as a symbol of a person walking), or words. In each of these examples, each light can be switched between and off state, an on state, or a flashing state, such as a flashing yellow light and a flashing red light. Traffic signal elements may include light emitting diodes ("LEDs"), bulbs, and/or any other suitable lighting elements.

The one or more computing devices includes a traffic signal element state determination module 112. The traffic signal element state determination module 112 is configured to analyze image data of traffic signal elements 106, taken by the one or more image capturing devices 104, in order to determine the color of the traffic signal element 106 (e.g., green yellow, or red), the shape of the traffic signal element 106 (e.g., circle, arrow, or lettering), and whether the traffic signal element 106 is a solid light or a flashing light (e.g., flashing yellow or flashing red). According to various embodiments, the traffic signal element state determination module 112 may be a Hidden Markov Model ("HMM")-based CPU state tracker, a recurrent neural network ("RNN")-based tracker, and/or other suitable form of traffic signal element state determination module 112.

Many traffic signal elements 106 include an LED. LEDs typically operate via pulse width modulation ("PWM"), in which a pulsed control signal causes the LED to rapidly turn on and off to achieve a desired level of brightness. When viewing the LED with a camera, the LED can appear to flicker due to the framerate and exposure settings of the camera in conjunction with the PWM of the LED.

For an LED with a fixed duty cycle that is captured by a camera having set framerate and exposure settings, the LED will have an oscillating intensity that results from the beat frequency between the camera and the LED duty cycle. The beat frequency and intensity profile may change if any of the parameters above change, producing what is referred to as a flicker, which is the apparent changes in LED bulb brightness due to these aforementioned effects.

Because of this, LED traffic signal elements 106 flicker. While this flickering is often too rapid to be detectable to the human eye, a digital camera, that is part of an AV's perception system, may detect it. This flickering is unrelated to the state of the traffic signal element 106 and should be disregarded in the state of the traffic signal element 106. In order for the traffic signal element state determination module 112 to determine whether a traffic signal element 106 is flashing, it must distinguish between a traffic signal element 106 that is flickering (i.e., rapidly turning on and off due to PWM) and one that is flashing (i.e., one that is being turned on and off at a human-perceptible speed to provide a signaling function).

In determining whether a yellow light in a traffic signal element 106 is flashing, a plurality of images of the yellow light, taken by the one or more image capturing devices 104, are analyzed by the traffic signal state determination module 112. The traffic signal state determination module 112, for each image in the plurality of images, determines whether the yellow light is in an on state or an off state. According to various embodiments, a timestamp is recorded for each image in the plurality of images, enabling the traffic signal state determination module 112 to determine at which time intervals the yellow light of the traffic signal element 106 was in the on state and at which intervals the yellow light of the traffic signal element 106 was in the off state.

Figure 2:
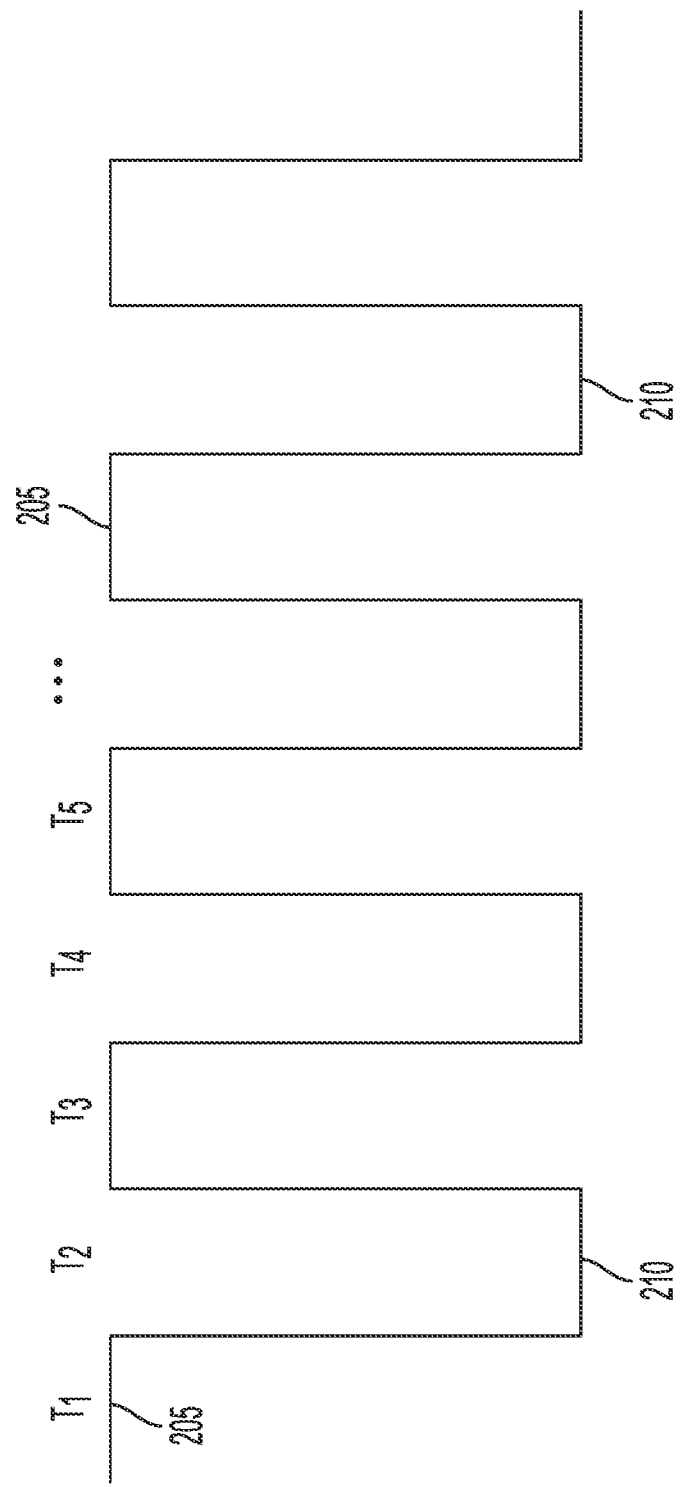
FIG. 2 is an example of a graphical representation of a square wave repeating pattern of a flashing light

For a flashing yellow light, the periods at which the traffic signal element 106 is in an on state and an off state are expected to follow a repeating pattern, such as shown in the square wave of FIG. 2.

As shown in FIG. 2, during the yellow on state, the yellow confidence is high, and during the yellow off state, the yellow confidence is low. The first high yellow confidence 205, corresponding to the yellow on state, lasts for a time duration of "$T_1$." The units of duration can be milliseconds, second, and/or other suitable units of duration. In some embodiments, the units of duration are counts which indicate how many times the state was determined to be on or off In the square wave of FIG. 2, the signal is summarized as (YELLOW, $T_1$), (OFF, $T_2$), (YELLOW, $T_3$), (OFF, $T_4$), (YELLOW, $T_5$), etc. According to various embodiments, the on states and off states, and their respective durations, are consolidated into a memory buffer 114.

The traffic signal state determination module 112 further analyzes the distinct on states and off states of the yellow light of the traffic signal element 106 to determine one or more cycles. Each cycle equates to a pair of consecutive distinct states and their durations. For example, the square wave of FIG. 2 includes the following cycles: cycle1= (YELLOW, $T_1$)+(OFF, $T_2$); cycle2=(OFF, $T_2$)+(YELLOW, $T_3$); cycle3=(YELLOW, $T_3$)+(OFF, $T_4$), cycle4=(OFF, $T_4$)+ (YELLOW, $T_5$), etc. Note that consecutive cycles overlap, e.g., cycle1 and cycle2 have (OFF, $T_2$) in common.

According to various embodiments, in order for the traffic signal state determination module 112 to determine that a cycle, (state$_A$, time$_A$)+(state$_B$, time$_B$), is considered a flashing yellow cycle (a cycle at which the yellow light of the traffic signal element 106 is flashing), it must satisfy the following conditions. The first condition is that state$_A$=YELLOW and state$_B$=OFF, or the state$_A$=OFF and state$_B$=YELLOW. The second condition is that the time duration of the yellow light in the on state (YELLOW) is greater than or equal to a lower threshold: a minimum on state time duration (min_on_count). According to some embodiments, in addition to being greater than or equal to the minimum on state time duration (min_on_count), the second condition includes that the time duration of the yellow light in the on state (YELLOW) is less than or equal to an upper threshold: a maximum on state time duration (max_on_count). The third condition is that the time duration of the yellow light in the off state (OFF) is greater than or equal to a lower threshold: a minimum off state time duration (min_off_count). According to some embodiments, in addition to being greater than or equal to the minimum off state time duration (min_off_count), the third condition includes that the time duration of the yellow light in the off state (OFF) is less than or equal to an upper threshold: a maximum off state time duration (max_off_count). According to some embodiments, a flashing traffic signal 106 should, in accordance with the guidelines of the Manual on Uniform Traffic Control Devices, have 50-60 flashing cycles per minute, with the traffic signal element 106 being in an on state for a duration of ½ to ⅔ of each cycle duration. It is noted however, that other cycle durations and/or on state durations may be used in conjunction with the present disclosure.

According to some embodiments, for flashing yellow lights, the min_on_count and the min_off_count are equal to 5 time duration units, and the max_on_count and the max_off_count are equal to 20 time duration units. It is noted, however, that other suitable values for the min_on_count, max_on_count, min_off_count, and max_off_count may be used, dependent upon the characteristics of the flashing light.

The memory buffer 114 stores a list of cycles (flashing yellow cycles), which met the aforementioned conditions in a number of slots, according to the following rules. The first rule is that the number of flashing yellow cycles is greater than or equal to a minimum number of flashing yellow cycles required for a yellow light to be considered a flashing yellow light. The second rule is that the end location slot value of the first cycle is less than or equal to num_used/2, where num_used is the number of slots in the memory buffer 114 containing valid data. Initially, not all slots will be used, and the oldest state is held at buffer slot 0. This condition checks that flashing pattern is historically present. The third rule is that the sum of the end location slot value of the last cycle and a max_delta_last_end is greater than or equal to num_used. The "max_delta_last_end" denotes how much earlier the last flashing yellow cycle can end. This condition checks whether a recent flashing cycle is present. According to some embodiments, the max_delta_last_end is set it at 25 for a HMM-based CPU state tracker, which corresponds to one second. It is noted, however, that other suitable lengths of time can be used by the present system 100.

Figure 3:
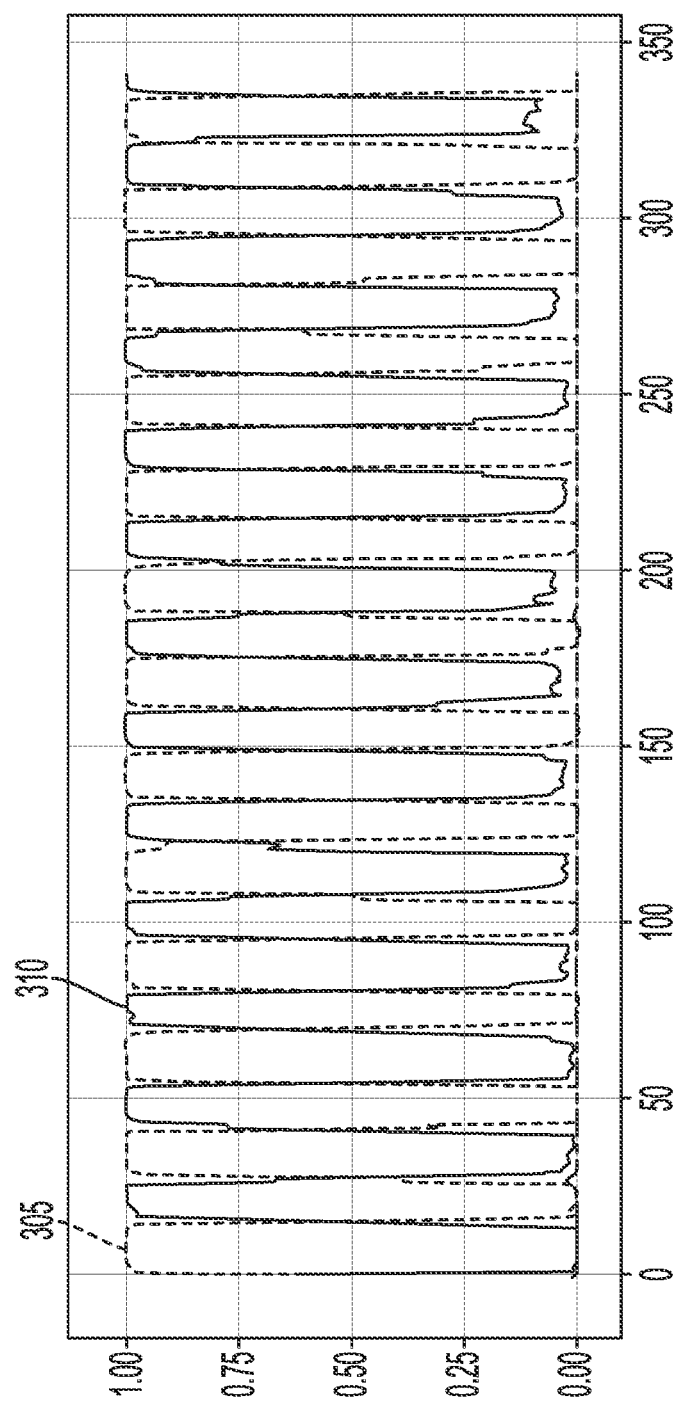
FIG. 3 is an example of a graphical representation of a flashing yellow light detected using a traffic signal state determination module, in accordance with the present disclosure.

FIG. 3 shows a flashing yellow light detected using the traffic signal state determination module 112. The x-axis denotes the number of updates the traffic signal state determination module 112 has returned. According to various embodiments, the traffic signal state determination module 112 can return approximately 20 to 25 updates per second. It is noted, however, that the traffic signal state determination module 112 may return greater or fewer updates per second, depending upon the traffic signal state determination module 112. The y-axis, between [0.0, 1.0], denotes the confidence of the different states (the on state 305, and the off state 310). When a state 305, 310 has a confidence score of 0.0, the state is determined to be not true, and when a state 305, 310 has a confidence score of 1.0, the state is determined to be true.

In determining whether a red light in a traffic signal element 106 is flashing, a plurality of images of the red light, taken by the one or more image capturing devices 104, are analyzed by the traffic signal state determination module 112. The traffic signal state determination module 112, for each image in the plurality of images, determines whether the red light is in an on state or an off state. According to various embodiments, a timestamp is recorded for each image in the plurality of images, enabling the traffic signal state determination module 112 to determine at which time intervals the red light of the traffic signal element 106 was in the on state and at which intervals the red light of the traffic signal element 106 was in the off state.

Similar to a flashing yellow light, for a flashing red light, the periods at which the traffic signal element 106 is in an on state and an off state are expected to follow a repeating pattern. The remaining logic for detecting a flashing red light is the same as the logic for detecting a flashing yellow light, except for the bounds of the min_off_count, min_on_count, max_off_count, and max_on_count, which is dependent upon the beat characteristics of the LED light being analyzed, which causes LED flickering. The change in the bounds is to increase inter-class variation between LED beat (for red LED lights) and the definition of flashing.

Figure 4:
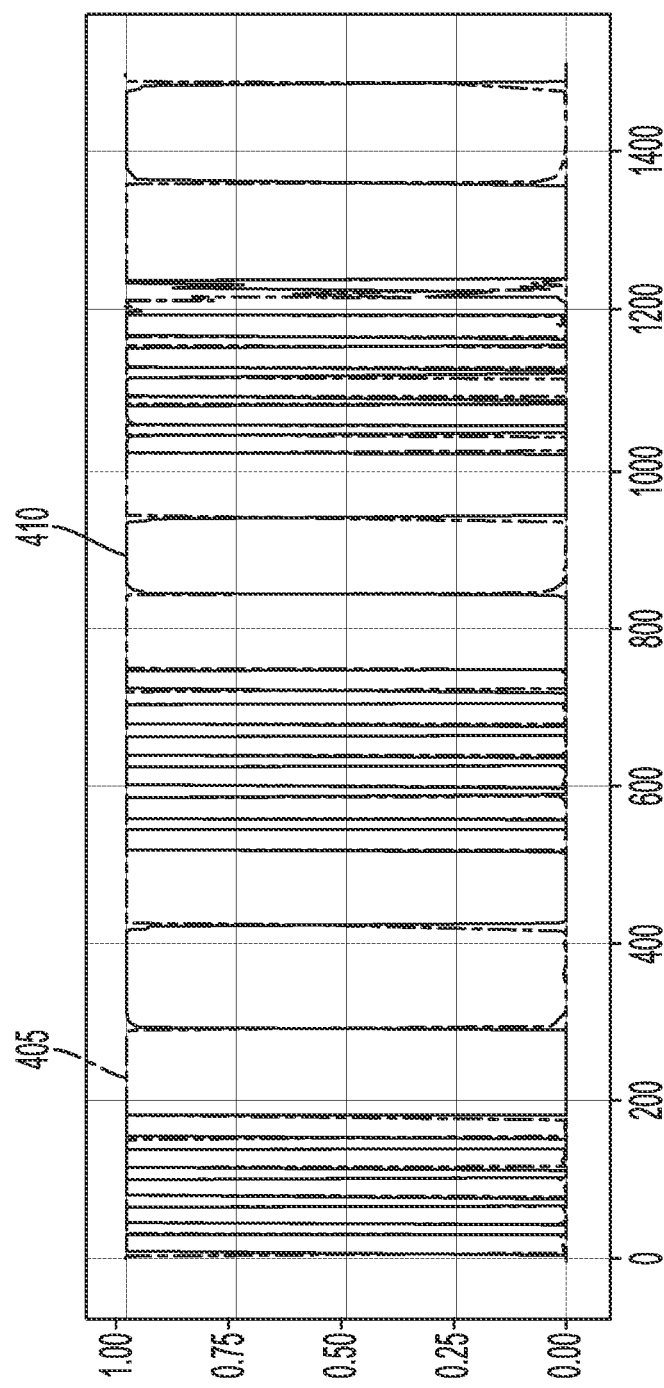
FIG. 4 is an example of a graphical representation of a beat for a red light detected using the traffic signal state determination module, in accordance with the present disclosure.

FIG. 4 shows LED beat for a red light detected using the traffic signal state determination module 112. The x-axis denotes the number of updates the traffic signal state determination module 112 has returned. The y-axis, between [0.0, 1.0], denotes the confidence of the different states (the on state 405, and the off state 410), for the red LED light. When a state 405, 410 has a confidence score of 0.0, the state is determined to be not true, and when a state 405, 410 has a confidence score of 1.0, the state is determined to be true.

Figure 5:
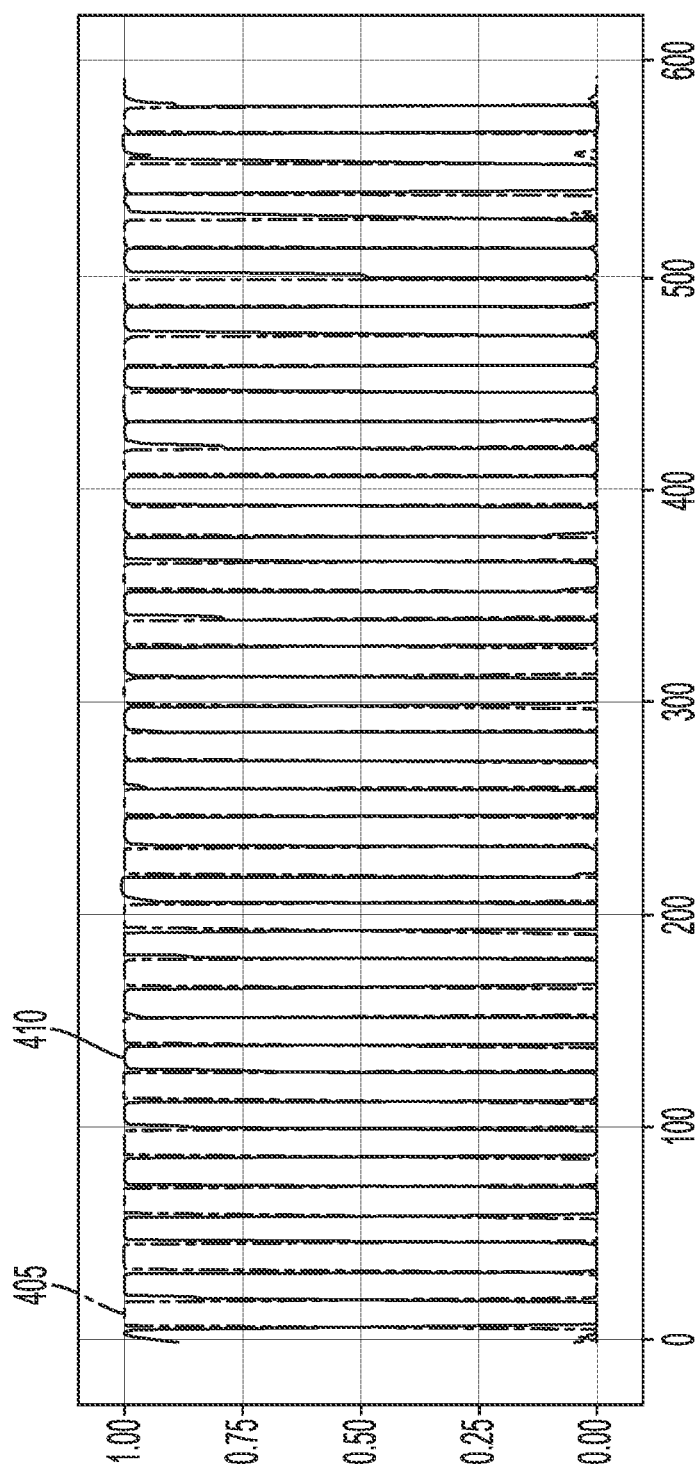
FIG. 5 is an example of a graphical representation of a flashing red light detected using a traffic signal state determination module, in accordance with the present disclosure.

In the initial region between 0 and 200, the states 405, 410 and their durations are (RED, 10), (OFF, 24), (RED, 11), (OFF, 24), (RED, 12), (OFF, 25), and (RED, 16). If the max_off_count for red light is set to 20, the limit is close to the duration of the OFF count. This would result is the system 100 falsely determining that solid red LED having beat is a flashing red light. Compare the red LED beat of FIG. 4 with the flashing red LED of FIG. 5. In FIG. 5, the states 405, 410 and their durations form a distinct on state/off state pattern that is not present in the beat.

According to various embodiments, a traffic signal element 106 of a traffic signal device 108 is only labeled as flashing if it meets the aforementioned conditions described herein. If a traffic signal element 106 in a traffic signal device 108 is not determined to be flashing based on the input, the state of the traffic signal element 106 is labeled as not flashing.

According to various embodiments, the system 100 includes a plurality of image capturing devices 104. The aforementioned tests for determining whether a traffic signal element 106 is flashing can be performed for image data collected from each of the plurality of image capturing devices 104. The results for each of the image capturing devices 104 can then be compared for validating the results for one or more image capturing devices 104.

A traffic signal device 108 may include a plurality of traffic signal elements 106. According to various embodiments, each traffic signal element 106 of the traffic signal device 108, or each of a subset of traffic signal elements 106 of the traffic signal device 108, are individually classified as being flashing or not flashing. This classification may be performed using image data from each camera 104 for a particular traffic signal element 106. For example, the periods of off and on for faces viewed by each of multiple different cameras 104 should be consistent with one another. According to various embodiments, an intensity profile for each traffic signal element 106 may also be stored, in addition to the classification data.

Traffic signal devices 108 are often redundant and convey repeated information. For example, a traffic signal device 108 may include a plurality of flashing lights (e.g., a plurality of flashing red lights, a plurality of flashing yellow lights, etc.). Traffic signal elements 106 of the same type and flash settings (e.g., a pair of flashing yellow lights, a pair of flashing red lights, etc.) should have consistent flashing classifications. For example, if a first traffic signal element 106 and a second traffic signal element 106 are redundant, then the first and second traffic signal element 106 should be flashing at the same time in order for the set of traffic signal elements 106 to be considered flashing.

An intersection may include a plurality of traffic signal devices 108. If two or more of the traffic signal devices 108 in the plurality of traffic signal devices 108 include redundant flashing traffic signal elements 106, the flashing traffic signal elements 106 of one traffic signal device 108 should be in phase with the flashing traffic signal elements 106 of the other traffic signal devices 108.

Accurately determining whether a state of a traffic signal element 106 is solid or flashing, and accurately differentiating between a flickering a flashing LED light, increases the likelihood that the AV's 102 movements following the instructions of the traffic signal element 106. This, in turn, increases ride safety and ride enjoyment/satisfaction, thus improving upon the existing technologies.

Figure 6:
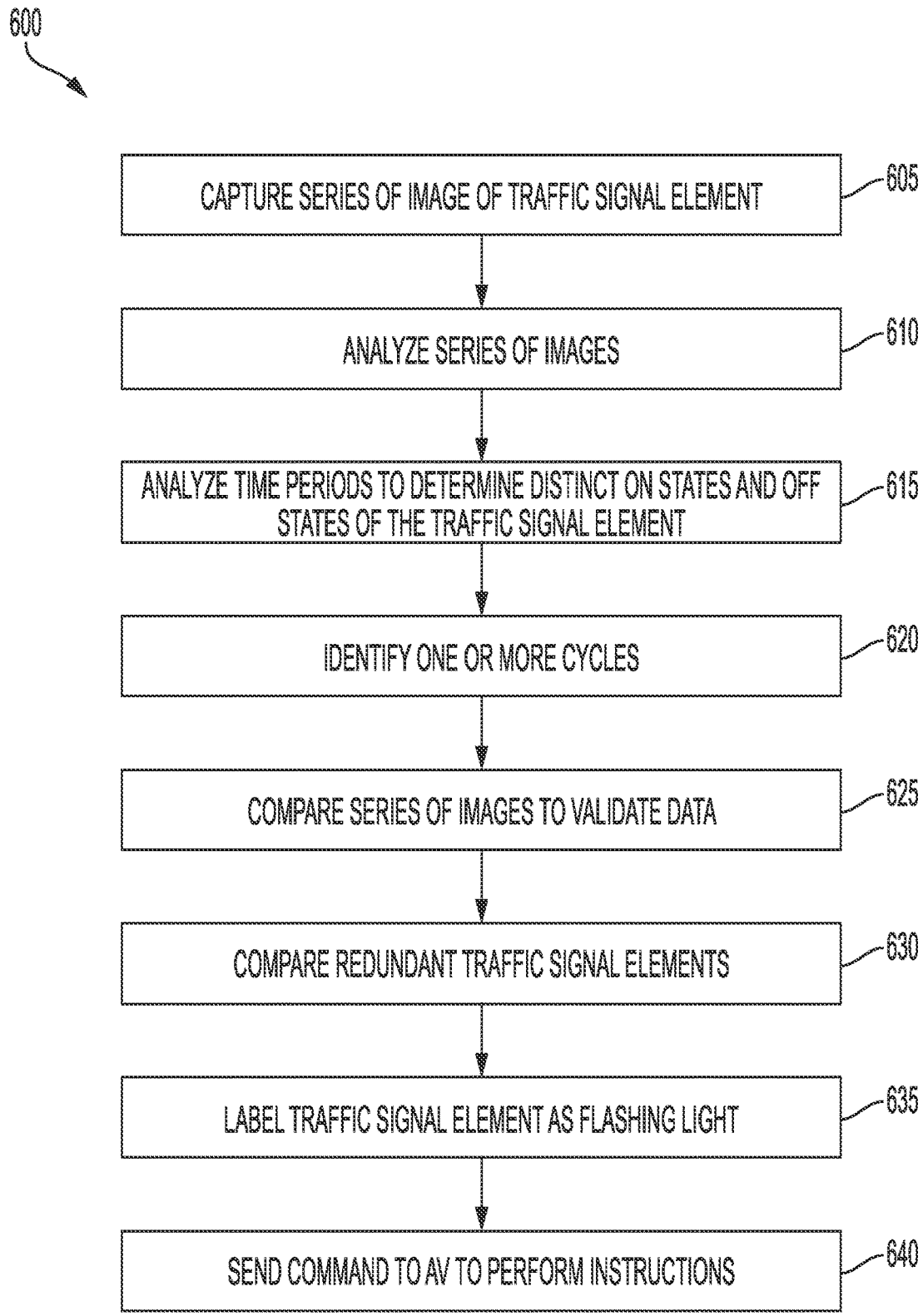
FIG. 6 is a flowchart of a method for detecting flashing lights, in accordance with the present disclosure.

Referring now to FIG. 6, a flowchart of a method 600 for detecting a flashing light on a traffic signal device is illustratively depicted.

According to various embodiments, at 605, one or more image capturing devices coupled to one or more AVs each capture a series of images of a traffic signal element of a traffic signal device over a length of time. The traffic signal element may include an LED such as, for example, a yellow LED or a red LED.

At 610, the series of images, are analyzed to determine one or more time periods at which the traffic signal element is in an on state, and one or more time periods at which the traffic signal element is in an off state. According to various embodiments, the analyzing the series of images includes generating a confidence score, for each image in the series of images, that the traffic signal element is in the on state and/or that the traffic signal element is in an off state. The time periods, at 615, are then analyzed in order to determine one or more distinct on states and one or more distinct off states of the traffic signal element as described herein.

At 620, one or more cycles are identified. Each cycle correlates to a distinct on state immediately followed by a distinct off state, or a distinct off state immediately followed by a distinct on state. According to various embodiments, the one or more image capturing devices include a plurality of image capturing devices, each image capturing device in the plurality of image capturing devices capturing a series of images of the traffic signal element over the length of time. At 625, the series of images for each image capturing device in the plurality of image capturing devices are compared, validating the data of the one or more of the image capturing devices in the plurality of image capturing devices. According to various embodiments, one or more traffic signal devices may include two or more redundant flashing lights. The two or more redundant flashing lights, at 630, are compared to determine if the two or more redundant flashing lights have matching on state and off state characteristics.

The cycles are analyzed to determine one or more groupings of adjacent cycles. Upon identifying a threshold number of adjacent cycles, the traffic signal element, at 635, is classified as a flashing light. According to various embodiments, in the event that that there are a plurality of redundant traffic signal elements, in addition to identifying a threshold number of adjacent cycles, in order to be classified as a flashing light, the plurality of redundant traffic signal elements must be determined to have matching on state and off state characteristics.

One the flashing light or lights have been classified, a command, at 640, is then sent to the AV to perform one or more instructions associated with the flashing light. For example, the instructions can include instructing the AV to stop, slow down (i.e., decrease speed), and/or other suitable instructions.

Figure 7:
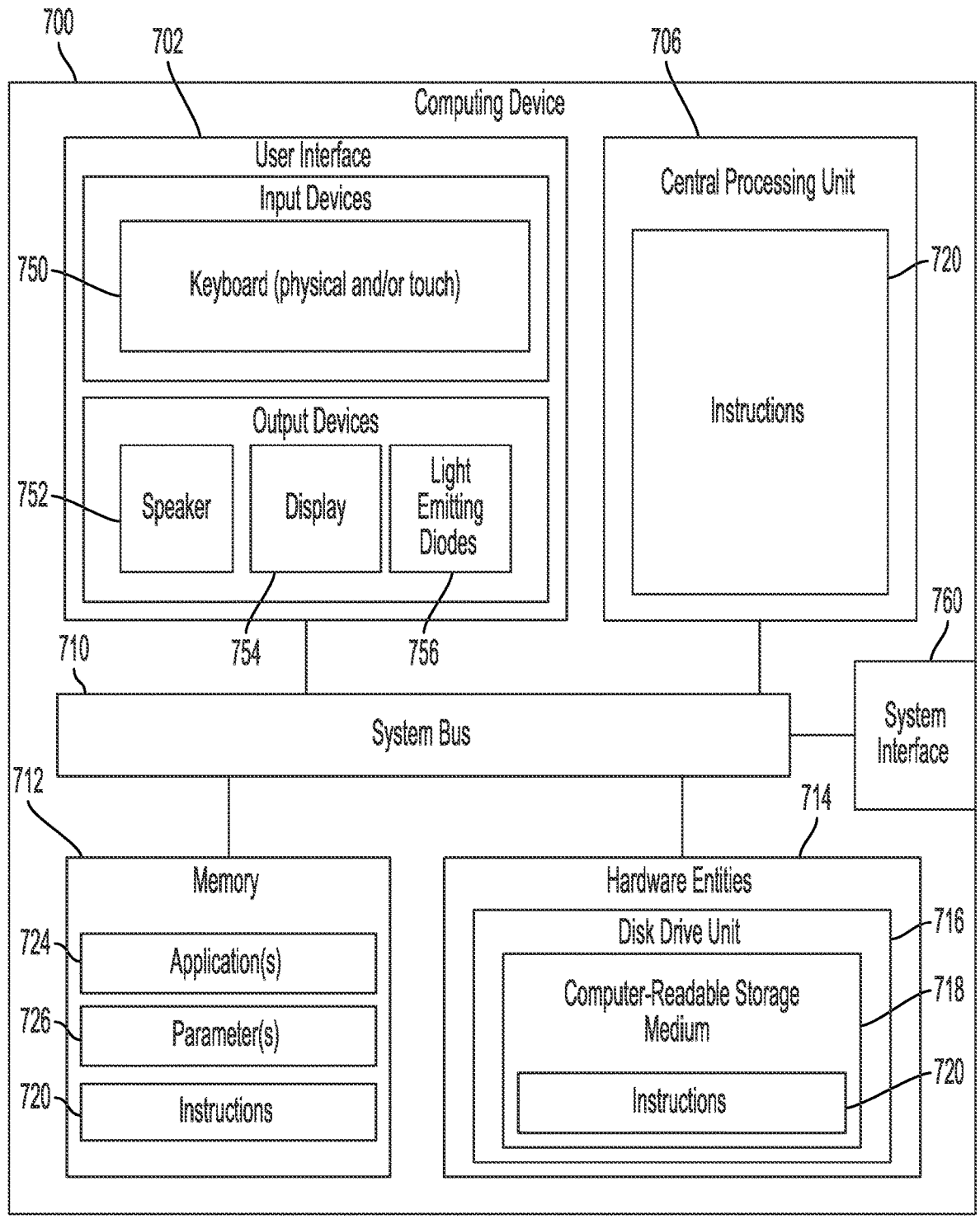
FIG. 7 is an illustration of an illustrative computing device, in accordance with the present disclosure.

Referring now to FIG. 7, an illustration of an illustrative architecture for a computing device 700 is provided. The computing device 110 of FIG. 1 is the same as or similar to computing device 700. As such, the discussion of computing device 700 is sufficient for understanding the computing device 110 of FIG. 1.

Computing device 700 may include more or less components than those shown in FIG. 6. However, the components shown are sufficient to disclose an illustrative solution implementing the present solution. The hardware architecture of FIG. 7 represents one implementation of a representative computing device configured to one or more juke events, as described herein. As such, the computing device 700 of FIG. 7 implements at least a portion of the method(s) described herein.

Some or all components of the computing device 700 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 7, the computing device 700 comprises a user interface 702, a Central Processing Unit ("CPU") 706, a system bus 710, a memory 712 connected to and accessible by other portions of computing device 700 through system bus 710, a system interface 760, and hardware entities 714 connected to system bus 710. The user interface can include input devices and output devices, which facilitate user-software interactions for controlling operations of the computing device 700. The input devices include, but are not limited to, a physical and/or touch keyboard 750. The input devices can be connected to the computing device 700 via a wired or wireless connection (e.g., a Bluetooth® connection). The output devices include, but are not limited to, a speaker 752, a display 754, and/or light emitting diodes 756. System interface 760 is configured to facilitate wired or wireless communications to and from external devices (e.g., network nodes such as access points, etc.).

At least some of the hardware entities 714 perform actions involving access to and use of memory 712, which can be a random access memory ("RAM"), a disk drive, flash memory, a compact disc read only memory ("CD-ROM") and/or another hardware device that is capable of storing instructions and data. Hardware entities 714 can include a disk drive unit 716 comprising a computer-readable storage medium 718 on which is stored one or more sets of instructions 720 (e.g., software code) configured to implement one or more of the methodologies, procedures, or functions described herein. The instructions 720 can also reside, completely or at least partially, within the memory 712 and/or within the CPU 706 during execution thereof by the computing device 700. The memory 712 and the CPU 706 also can constitute machine-readable media. The term "machine-readable media", as used here, refers to a single medium or multiple media (e.g., a centralized or distributed database, and/or associated caches and servers) that store the one or more sets of instructions 720. The term "machine-readable media", as used here, also refers to any medium that is capable of storing, encoding or carrying a set of instructions 720 for execution by the computing device 700 and that cause the computing device 700 to perform any one or more of the methodologies of the present disclosure.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method of detecting a solid light of at least one traffic signal element, the method comprising:
   by one or more image capturing devices of an autonomous vehicle, capturing a series of images of at least one traffic signal element over a length of time;
   by an autonomous vehicle control system of the autonomous vehicle:
      analyzing the series of images to determine time intervals when the traffic signal element is in an on state and time intervals when the traffic signal element is in an off state;
      further analyzing the series of images to determine one or more flashing cycles comprising a first time interval when the traffic signal element is in a first state for at least a first minimum duration and less than a first maximum duration followed by a second time interval when the traffic signal element is in a second state for at least a second minimum duration threshold and less than a second maximum duration, the first state different than the second state;
      determining an end time of a last flashing cycle in the series of images; and
      upon detecting a minimum number of flashing cycles in the series of images and determining that a delta time between the end time of the last flashing cycle and the end time of the series of images is greater than a maximum time delta, classifying the traffic signal element as a solid light.

2. The method of claim 1, wherein the analyzing the series of images includes generating a confidence score, for each image in the series of images, that the traffic signal element is in the on state.

3. The method of claim 1, wherein the analyzing the series of images includes generating a confidence score, for each image in the series of images, that the traffic signal element is in the off state.

4. The method of claim 1, further comprising, by the autonomous vehicle control system of the autonomous vehicle, sending a command to the autonomous vehicle to perform one or more instructions associated with the solid light.

5. The method of claim 4, wherein the one or more instructions include one or more of the following: stop; and decrease speed.

6. The method of claim 1, wherein the traffic signal element includes a light emitting diode.

7. The method of claim 6, wherein the light emitting diode is a yellow light emitting diode or a red light emitting diode.

8. The method of claim 1, wherein the one or more image capturing devices include a plurality of image capturing devices, and further comprising comparing the series of images for each image capturing device in the plurality of image capturing devices.

9. The method of claim 1, wherein the traffic signal element includes a plurality of redundant traffic signal elements, and
   further comprising comparing one or more cycles of each of the plurality of redundant traffic signal elements.

10. A system for detecting a solid light of at least one traffic signal element, the system comprising:
    one or more image capturing devices of an autonomous vehicle, each image capturing device being configured to capture a series of images of at least one traffic signal element over a length of time; and
    a computing device of the autonomous vehicle, including:
       a processor; and
       a memory,
       wherein the computing device includes instructions, wherein the instructions cause the computing device to:
          analyze the series of images to determine time intervals when the traffic signal element is in an on state and time intervals when the traffic signal element is in an off state;
          further analyze the series of images to determine one or more flashing cycles comprising a first time interval when the traffic signal element is in a first state for at least a first minimum duration and less than a first maximum duration followed by a second time interval when the traffic signal element is in a second state for at least a second minimum duration threshold and less than a second maximum duration, the first state different than the second state;
          determine an end time of a last flashing cycle in the series of images; and
          upon detecting a minimum number of flashing cycles in the series of images and determining that a delta time between the end time of the last flashing cycle and the end time of the series of images is greater than a maximum time delta, classifying the traffic signal element as a solid light.

11. The system of claim 10, wherein the analyzing the series of images includes generating a confidence score, for each image in the series of images, that the traffic signal element is in the on state.

12. The system of claim 10, wherein the analyzing the series of images includes generating a confidence score, for each image in the series of images, that the traffic signal element is in the off state.

13. The system of claim 10, wherein the instructions are further configured to cause the computing device to send a command to the autonomous vehicle to perform one or more instructions associated with the solid light.

14. The system of claim 13, wherein the one or more instructions include one or more of the following: stop; and decrease speed.

15. The system of claim 10, wherein each of the one or more traffic signal elements includes a light emitting diode.

16. The system of claim 15, wherein the light emitting diode is a yellow light emitting diode or a red light emitting diode.

17. The system of claim 10,
wherein the one or more image capturing devices include a plurality of image capturing devices, and
wherein the instructions are further configured to cause the computing device to compare the series of images for each image capturing device in the plurality of image capturing devices.

18. The system of claim 10, wherein the one or more traffic signal elements include a plurality of redundant traffic signal elements, and
wherein the instructions are further configured to cause the computing device to compare one or more cycles of each of the plurality of redundant traffic signal elements.

* * * * *